United States Patent
Butcher et al.

(10) Patent No.: US 11,162,416 B2
(45) Date of Patent: Nov. 2, 2021

(54) ATTRITABLE ENGINE INTEGRATED WITH VEHICLE

(71) Applicant: United Technologies Corporation, Farmington, CT (US)

(72) Inventors: Evan Butcher, Suffield, CT (US); Jesse R. Boyer, Middletown, CT (US); Om P. Sharma, South Windsor, CT (US); Lawrence Binek, Glastonbury, CT (US); Bryan G. Dods, Greer, SC (US); Vijay Narayan Jagdale, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 410 days.

(21) Appl. No.: 16/222,109

(22) Filed: Dec. 17, 2018

(65) Prior Publication Data
US 2020/0191053 A1 Jun. 18, 2020

(51) Int. Cl.
| | |
|---|---|
| *F02C 6/20* | (2006.01) |
| *F01D 25/24* | (2006.01) |
| *B60K 3/04* | (2006.01) |
| *B33Y 10/00* | (2015.01) |
| *B33Y 80/00* | (2015.01) |
| *F01D 25/26* | (2006.01) |
| *F01D 25/28* | (2006.01) |
| *F02C 7/20* | (2006.01) |
| *F02K 1/80* | (2006.01) |

(52) U.S. Cl.
CPC .................. *F02C 6/20* (2013.01); *B60K 3/04* (2013.01); *F01D 25/243* (2013.01); *B33Y 10/00* (2014.12); *B33Y 80/00* (2014.12); *F05D 2230/22* (2013.01); *F05D 2230/30* (2013.01)

(58) Field of Classification Search
CPC ..... F02C 6/20; F02C 7/20; B60K 3/04; F01D 25/28; F01D 25/243; F01D 25/26; B33Y 10/00; B33Y 80/00; F02K 1/80; F02K 1/822; F02K 3/02; F05D 2260/231; F05D 2230/53; F05D 2230/22; F05D 2230/30; Y02T 50/60
See application file for complete search history.

(56) References Cited

U.S. PATENT DOCUMENTS

| | | | | |
|---|---|---|---|---|
| 2,631,796 | A | * | 3/1953 | Williamson, Jr. ........ F02C 7/12 244/74 |
| 6,068,212 | A | * | 5/2000 | Ash ........................ B64D 27/14 244/54 |
| 9,086,033 | B2 | * | 7/2015 | Dushku .................... F02K 9/08 |
| 9,796,486 | B1 | | 10/2017 | Illsley et al. |
| 9,863,368 | B1 | | 1/2018 | Ress |
| 2018/0156056 | A1 | * | 6/2018 | Bonacum ................ F01D 17/12 |

OTHER PUBLICATIONS

European Search Report dated May 18, 2020 issued for corresponding European Patent Application No. 19217135.3.

* cited by examiner

*Primary Examiner* — Bayan Salone
(74) *Attorney, Agent, or Firm* — Bachman & LaPointe, P.C.

(57) ABSTRACT

A vehicle structure with unitary casing for an attritable gas turbine engine comprising a vehicle structure forming a unitary casing having a casing wall opposite the vehicle structure; a bypass duct formed between the casing wall and the vehicle structure, wherein the unitary casing is configured to receive a core of the attritable gas turbine engine.

18 Claims, 3 Drawing Sheets

ATTRITABLE ENGINE INTEGRATED WITH VEHICLE

BACKGROUND

The present disclosure is directed to a vehicle structure with unitary casing for attritable engine applications.

Attritable or expendable propulsion systems have a short lifespan relative to typical flight applications. The attritable engine is utilized for a limited lifespan and disposed. The attritable gas turbine engine may not even be operated through a full operational cycle. The attritable gas turbine engine may only perform start-up, and operational load before being decommissioned.

Since the operational modes of the attritable gas turbine engine may be significantly less than the conventional gas turbine engine, the attritable engine does not need to meet the same durability or safety requirements as the conventional gas turbine engine. Conventional gas turbine engine manufacturing techniques deployed for attritable engines can be more costly and more complex than needed. Since conventional manufacturing techniques can be more costly, additive manufacturing techniques may be deployed in substitute to reduce cost and complexity of the attritable gas turbine engine.

Attritable engines E as shown in FIG. 1, the gas turbine engine E requires a casing C and associated engine core. The separate casing with core installed can add weight, cost and part count to the attritable engine design.

Additionally, the small attritable engine E as shown in FIG. 1, includes a separate insulation blanket B wrapped around the casing. The insulation blanket B reduces the heat transfer from the hot sections located inboard of the gas turbine engine to the exterior of the casing. The insulation blanket B is also an additional part or can be multiple parts assembled with the attritable gas turbine engine E.

What is needed is an additively integrated vehicle structure with the casing for attritable engine applications that can eliminate the need for a separate engine casing.

SUMMARY

In accordance with the present disclosure, there is provided a vehicle structure with unitary casing for an attritable gas turbine engine comprising a vehicle structure forming a unitary casing having a casing wall opposite the vehicle structure; a bypass duct formed between the casing wall and the vehicle structure, wherein the unitary casing is configured to receive a core of the attritable gas turbine engine.

In another and alternative embodiment, the unitary casing is configured to couple with the core of the attritable gas turbine engine.

In another and alternative embodiment, the vehicle structure with unitary casing further comprises at least one spar extending between the casing wall and the engine structure within the bypass duct.

In another and alternative embodiment, the vehicle structure with unitary casing further comprises a coupling attached to the unitary casing configured to attach the core of the attritable gas turbine engine.

In another and alternative embodiment, the unitary casing is unitary with the casing.

In another and alternative embodiment, the unitary casing and support structure comprises insulation integrally formed throughout a core support section and an exhaust section.

In another and alternative embodiment, the unitary casing comprises the same material composition as the vehicle structure.

In accordance with the present disclosure, there is provided a unitary casing for an attritable gas turbine engine comprising the unitary casing formed unitary with a vehicle structure configured to support the gas turbine engine; and the unitary casing configured to couple with a core of the gas turbine engine.

In another and alternative embodiment, the vehicle structure comprises an intake section upstream of a core support section and an exhaust section detachably coupled downstream from the core support section.

In another and alternative embodiment, the unitary casing comprises a casing wall formed unitary with the core support section of the vehicle structure configured to insulate the attritable gas turbine engine.

In another and alternative embodiment, the unitary casing further comprises at least one spar extending between the casing wall and the vehicle structure.

In another and alternative embodiment, the casing wall and vehicle structure are configured in at least one of a single compartment and multiple compartments between the at least one spar.

In another and alternative embodiment, the unitary casing further comprises a core mounting coupling extending from the casing wall proximate the core support section, wherein the core mounting coupling is configured to attach the core to the unitary casing within the core support section.

In accordance with the present disclosure, there is provided a process for forming a vehicle structure configured to support an attritable gas turbine engine comprising forming a unitary casing unitary with the vehicle structure, wherein the unitary casing is configured to mount to a core of the attritable gas turbine engine.

In another and alternative embodiment, forming the unitary casing and the vehicle structure comprises model-based additive manufacturing techniques.

In another and alternative embodiment, the forming the unitary casing comprises changing process parameters to produce the unitary casing within the vehicle structure.

In another and alternative embodiment, the process further comprises forming a core mounting coupling comprising at least one of an anti-rotation feature and an indexing feature configured to mount and couple the core to the unitary casing.

In another and alternative embodiment, the unitary casing comprises the same material composition as the vehicle structure.

In another and alternative embodiment, the process further comprises locating at least one spar between the unitary casing and the vehicle structure.

In another and alternative embodiment, the process further comprises forming a bypass duct of the gas turbine engine between the unitary casing and the vehicle structure.

There is an opportunity to leverage additive manufacturing (AM) techniques to improve various aspects of these limited-life products' lifecycles. These aspects include unitizing assembly details, integration of complex performance-enhancing features, lowering production costs, and reducing time to delivery; typically prohibitive when leveraging conventional manufacturing techniques.

Other details of the vehicle structure with unitary casing are set forth in the following detailed description and the accompanying drawings wherein like reference numerals depict like elements.

DETAILED DESCRIPTION

Figure 1:
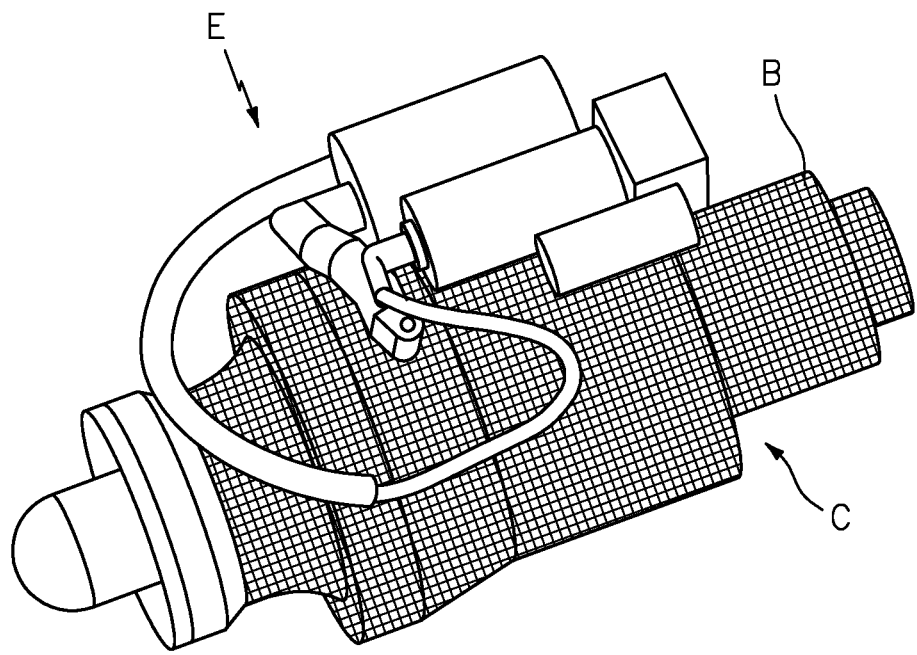
FIG. 1 an isometric view of a schematic representation of a prior art attritable gas turbine engine.
Figure 2:
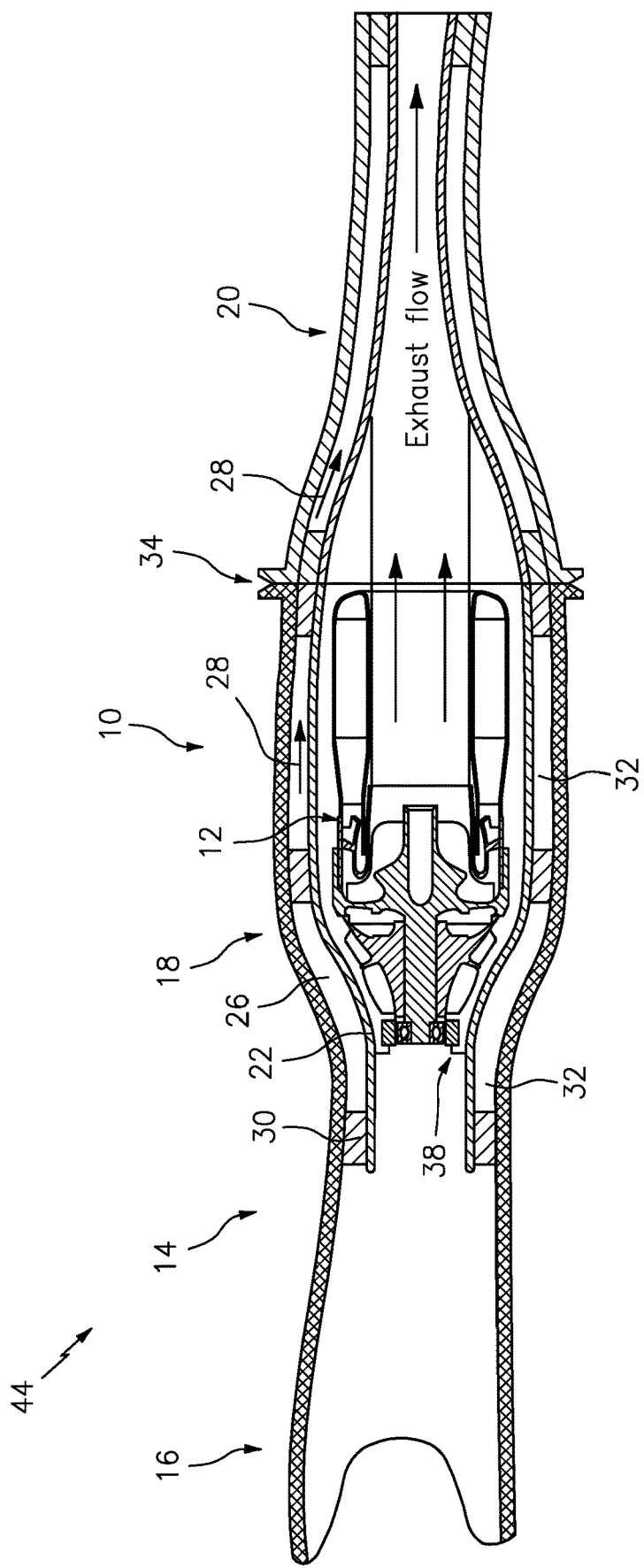
FIG. 2 is a cross sectional view of a schematic representation of an exemplary attritable gas turbine engine core integrated with a unitary casing/vehicle structure.
Figure 3:
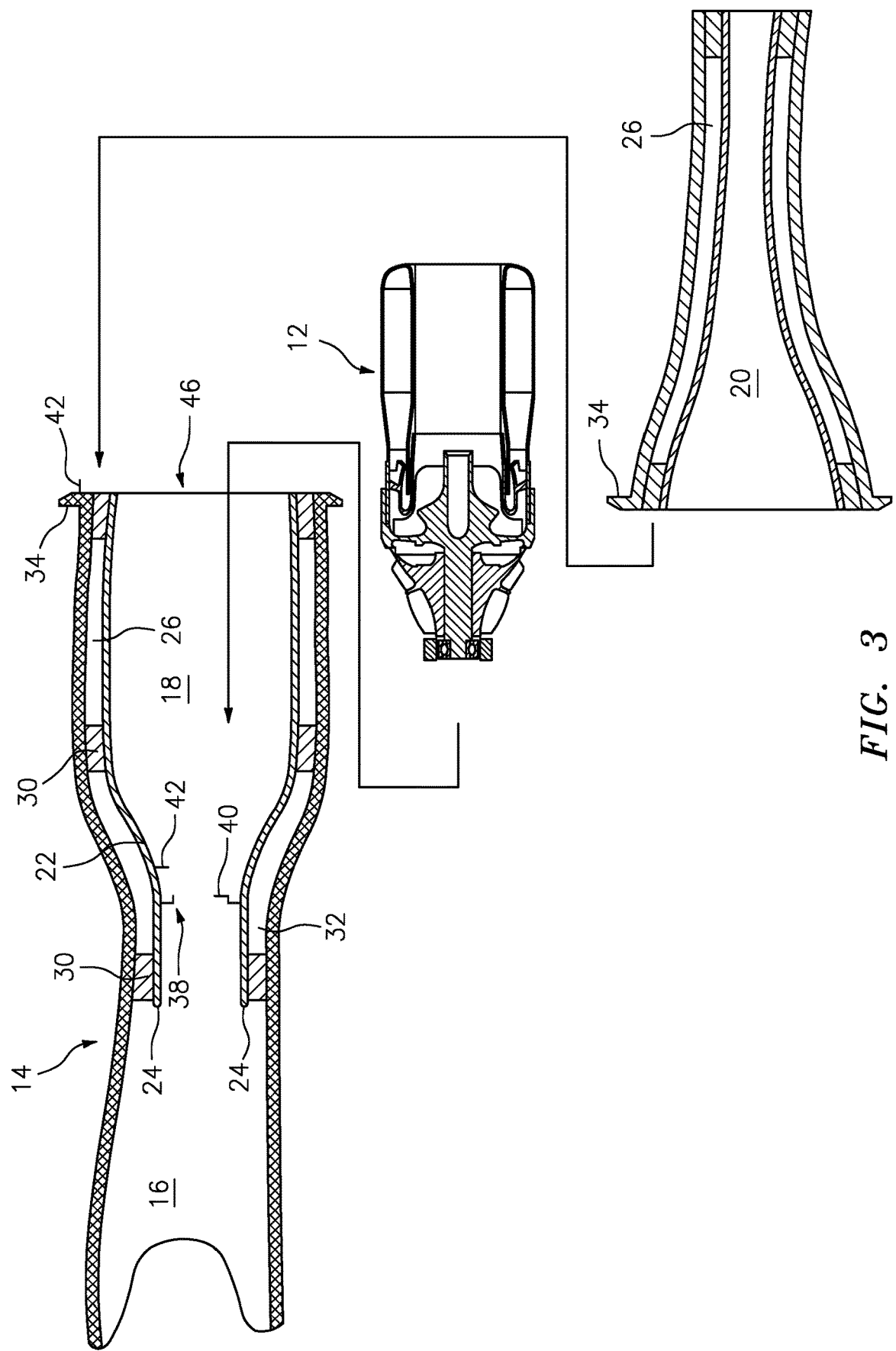
FIG. 3 is an exploded view of a schematic representation of a cross section of an exemplary unitary casing/vehicle structure and attritable gas turbine engine core.

Referring now to FIG. 2 and FIG. 3, there is illustrated an exemplary attritable gas turbine engine 10, with a core 12 including compressor, turbine, combustor sections. A vehicle structure 14 is shown surrounding the core 12. The vehicle structure 14 can include an intake section 16 upstream of a core support section 18 and an exhaust section 20 detachably coupled downstream from the core support section 18. The vehicle structure 14 includes a unitary casing 22. The unitary casing 22 includes a casing wall 24. The casing wall 24 and vehicle structure 14 define a bypass duct 26. The bypass duct 26 is configured as a passage for bypass air 28. The bypass duct 26 is also configured to support cooling and thermal insulation from the thermal energy generated from the core 12.

The vehicle structure 14 and casing wall 24 can be coupled and supported by spars 30 that are configured to structurally support the casing wall 24. The casing wall 24 can be constructed to form a single or multiple compartments 32 throughout the bypass duct 26. The spars 30 can allow for air 28 to pass from compartment 32 to compartment 32.

The core support section 18 and exhaust section 20 can be demountably coupled by use of flanges 34 or equivalent structure. The core 12 can be inserted into the core support section 18 more easily, through removing the exhaust section 20 and reconnecting the exhaust section 20 for assembly.

The unitary casing 22 is unitary with the vehicle structure 14. The unitary casing 22 is formed integrally with the vehicle structure 14. The unitary casing 22 can be located integrally throughout the core support section 18 and exhaust section 20. The unitary casing 22 can also serve as insulation 36 for the core 12 of the gas turbine engine 10. The compartments 32 formed by the unitary casing wall 24 and vehicle structure 14 have excellent thermal insulating properties due to the convection from fluid flow through the bypass duct 26. The insulating properties of the compartments 33 can be maintained after the start the gas turbine engine, since the bypass duct 26 will have air flowing within. The bypass duct 26 serves to reduce heat transfer from the core 12 to the cooler vehicle structure 14.

A core mounting coupling 38 can be coupled to the casing wall 24 proximate the core support section 18. The coupling 38 can be configured to attach the core 12 to the unitary casing 22 within the core support section 18. The core mounting coupling 38 can include anti-rotation features 40 to support the core 12 in a fixed position. There can be indexing features 42 integrated with the core mounting coupling 38 or as stand-alone features configured with the casing wall 24 and/or flange 34.

The unitary casing 22 can be formed along with the vehicle structure 14 by use of additive manufacturing. In an exemplary embodiment, the unitary casing 22 can be formed utilizing fused deposition model-based additive manufacturing techniques or selective laser sintering techniques. Those exemplary additive manufacturing techniques can include changing process parameters to produce the unitary casing 22 along with the vehicle structure 14.

In an exemplary embodiment, the unitary casing 22 along with the vehicle structure 14 can be formed as one utilizing model-based additive manufacturing techniques. The additive manufacturing techniques can include changing process parameters to produce the unitary casing 22 along with the vehicle structure 14. The additive manufacturing techniques can include determining the bypass flow volume requirements, insulation value of the vehicle structure 14 with unitary casing 22. Dimensioning the bypass duct 26 to accommodate the mass flow rate and insulation value requirements. The additive manufacturing techniques can include determining a predetermined support loading and stress requirements of the unitary casing 22, building a file generator; and determining the finite element solution of the stress. The analysis above can help with locating at least one spar between vehicle structure 14 and the unitary casing 22.

The gas turbine engine 10 can be fully integrated within the vehicle structure 14. The vehicle structure 14 is illustrated as ducting, but it is contemplated that the vehicle structure 14 can be any structural component on a vehicle 44, such as a wing, fuselage, empennage, chassis, body, and the like. The core 12 of the gas turbine engine 10 can be assembled into the core support section 18 via an aft opening 46 formed by decoupling the vehicle structure 14 at the core support section 18 and exhaust section 20. The coupling 38, anti-rotation features 40 and indexing features 42 can be employed to mount and couple the core to the unitary casing 22. The exhaust section 20 can be attached to the core support section 18 via flanges 34.

The vehicle structure 14 with unitary casing 22 provides the advantage of customization of the internal geometry of the bypass duct of the gas turbine engine/vehicle for unique insulating efficiencies via heat exchanging/insulating features.

The vehicle structure 14 with unitary casing 22 provides the advantage of utilizing additive manufacturing to enable thin walls and a capability to create complex geometries not traditionally achievable via casting or machining.

The vehicle structure 14 with unitary casing 22 provides the advantage of geometries to potentially customize the installation needs of the attritable engine.

The vehicle structure 14 with unitary casing 22 provides the advantage of cost reduction via the reduction of the number of parts and assembly.

There has been provided a vehicle structure 14 with unitary casing 22 for attritable engine applications. While vehicle structure 14 with unitary casing 22 has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A vehicle structure with unitary casing for an attritable gas turbine engine comprising:
   a vehicle structure forming a unitary casing having a casing wall opposite said vehicle structure, wherein said unitary casing comprises the casing wall formed unitary with a core support section of the vehicle structure configured to insulate said attritable gas turbine engine;

a bypass duct formed between said casing wall and said vehicle structure, wherein said unitary casing is configured to receive a core of said attritable gas turbine engine.

2. The vehicle structure with unitary casing according to claim 1, wherein said unitary casing is configured to couple with said core of the attritable gas turbine engine.

3. The vehicle structure with unitary casing according to claim 1, further comprising:
   at least one spar extending between said casing wall and said vehicle structure within said bypass duct.

4. The vehicle structure with unitary casing according to claim 1, further comprising:
   a coupling attached to the unitary casing configured to attach said core of the attritable gas turbine engine.

5. The vehicle structure with unitary casing according to claim 1, wherein said unitary casing and support structure comprises insulation integrally formed throughout a core support section and an exhaust section.

6. The vehicle structure with unitary casing according to claim 1, wherein said unitary casing comprises the same material composition as said vehicle structure.

7. A unitary casing for an attritable gas turbine engine comprising:
   the unitary casing formed unitary with a vehicle structure configured to support the gas turbine engine, wherein the vehicle structure comprises an intake section upstream of a core support section and an exhaust section detachably coupled downstream from the core support section; and
   the unitary casing configured to couple with a core of the gas turbine engine.

8. The unitary casing according to claim 7, wherein said unitary casing comprises a casing wall formed unitary with the core support section of the vehicle structure configured to insulate said attritable gas turbine engine.

9. The unitary casing according to claim 7, further comprising:
   at least one spar extending between said casing wall and said vehicle structure.

10. The unitary casing according to claim 9, wherein the casing wall and vehicle structure are configured in at least one of a single compartment and multiple compartments between the at least one spar.

11. The unitary casing according to claim 8, further comprising:
    a core mounting coupling extending from the casing wall proximate the core support section, wherein the core mounting coupling is configured to attach the core to the unitary casing within the core support section.

12. A process for forming a vehicle structure configured to support an attritable gas turbine engine comprising:
    forming a unitary casing unitary with said vehicle structure, wherein said unitary casing is configured to mount to a core of the attritable gas turbine engine, wherein the vehicle structure comprises an intake section upstream of a core support section and an exhaust section detachably coupled downstream from the core support section.

13. The process of claim 12, wherein forming said unitary casing and said vehicle structure comprises model-based additive manufacturing techniques.

14. The process of claim 12, wherein forming said unitary casing comprises:
    changing process parameters to produce said unitary casing within said vehicle structure.

15. The process of claim 14, further comprising:
    forming a core mounting coupling comprising at least one of an anti-rotation feature and an indexing feature configured to mount and couple the core to the unitary casing.

16. The process of claim 12, wherein said unitary casing comprises the same material composition as said vehicle structure.

17. The process of claim 12, further comprising:
    locating at least one spar between said unitary casing and said vehicle structure.

18. The process of claim 12, further comprising:
    forming a bypass duct of the gas turbine engine between said unitary casing and said vehicle structure.

* * * * *